United States Patent [19]

Burrows et al.

[11] 3,750,483

[45] Aug. 7, 1973

[54] PORTABLE RECIPROCATING SAW DRIVE MECHANISM

[75] Inventors: Milford D. Burrows, Avon; Peter H. Morganson, Winsted, both of Conn.

[73] Assignee: The Stanley Works, New Britain, Conn.

[22] Filed: Apr. 21, 1972

[21] Appl. No.: 246,156

[52] U.S. Cl. .................................. 74/50, 30/392
[51] Int. Cl. ........................................ F16h 21/18
[58] Field of Search .................. 74/50, 49; 30/392

[56] References Cited
UNITED STATES PATENTS
2,704,941  3/1955  Holford ............................... 74/50
3,246,528  4/1966  Kosch ................................. 74/50

Primary Examiner—Charles J. Myhre
Assistant Examiner—F. D. Shoemaker
Attorney—John M. Prutzman, Donald J. Hayes et al.

[57] ABSTRACT

An elongated portable reciprocating saw having a rear spade handle, a forwardly projecting tubular saw blade support slide, an intermediate electric motor with a longitudinally extending drive shaft in parallel overlapping relationship with the tubular slide, and a pair of upstanding rotary drive assemblies on opposite sides of the motor shaft and tubular slide each having a worm wheel in engagement with a worm on the forward end of the motor shaft and an upstanding roller received within a yoke crosspiece on the slide.

7 Claims, 3 Drawing Figures

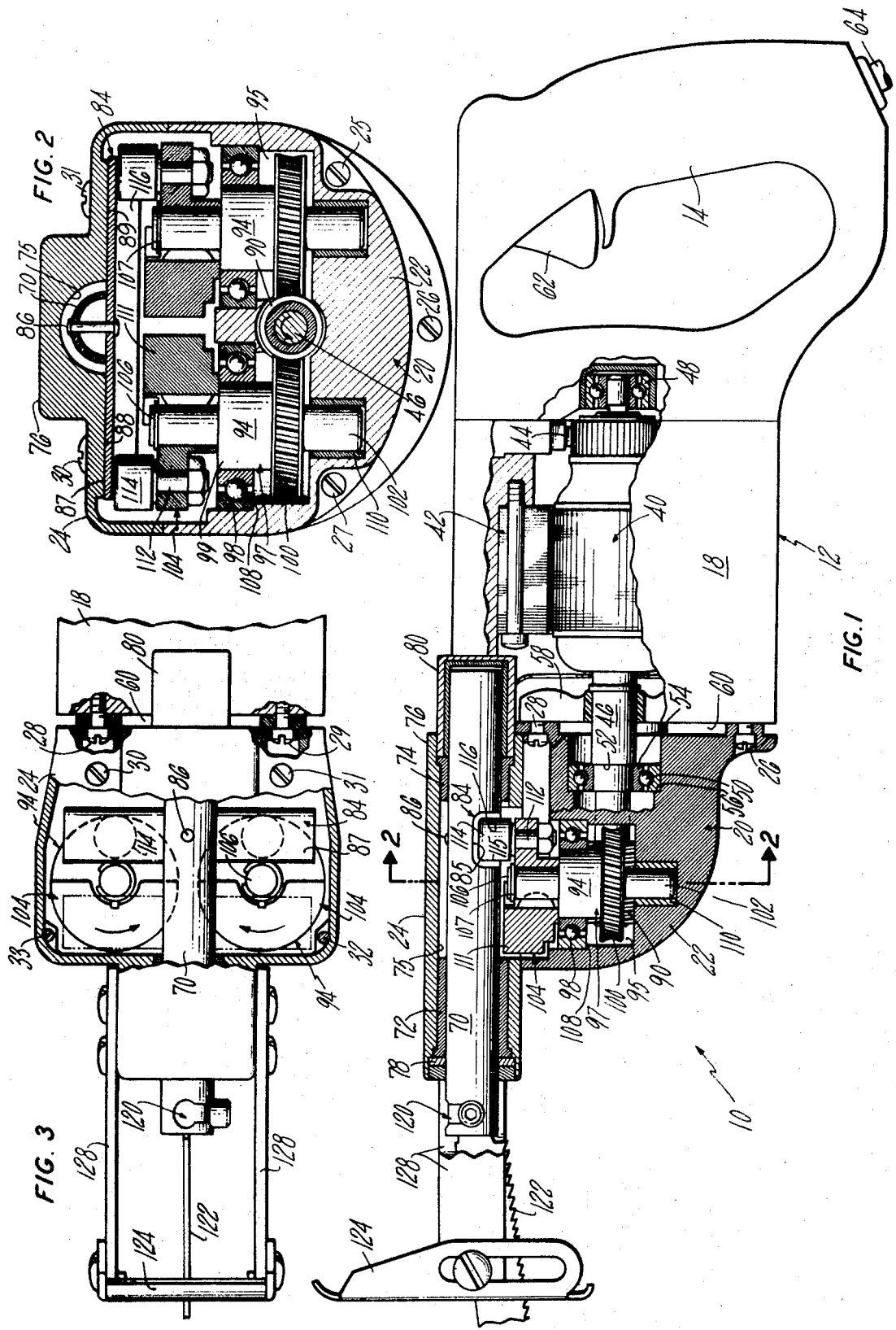

PORTABLE RECIPROCATING SAW DRIVE MECHANISM

BRIEF SUMMARY OF THE INVENTION

The present invention relates generally to portable reciprocating saws and more particularly to a new and improved drive mechanism for a portable reciprocating saw.

It is a primary aim of the present invention to provide a new and improved drive mechanism for a portable reciprocating saw providing a compact reciprocating saw useful for various applications and in hard-to-reach locations.

It is another aim of the present invention to provide a new and improved drive mechanism for a portable reciprocating saw having an economical and reliable construction and providing a long service free useful life.

Other objects will be in part obvious and in part pointed out more in detail hereinafter.

A better understanding of the invention will be obtained from the following detailed description and the accompanying drawing of an illustrative application of the invention.

BRIEF DESCRIPTION OF THE DRAWING

In the drawing:

FIG. 1 is a side view, partly broken away and partly in section, of a portable reciprocating saw incorporating an embodiment of the present invention;

FIG. 2 is an enlarged transverse section view, partly in section, of the portable reciprocating saw taken substantially along line 2—2 of FIG. 1; and FIG. 3 is a partial top view, partly broken away and partly in section, of the portable reciprocating saw.

DESCRIPTION OF THE PREFERRED EMBODIMENT

Referring now to the drawing in detail wherein like numerals represent like parts throughout the several figures, a portable reciprocating saw 10 incorporating an embodiment of the present invention is shown comprising an elongated multipart housing 12 having a rear spade handle housing 14, a cylindrical motor housing 18 and a forward transmission housing 20 with lower and upper housing parts 22, 24. The spade handle housing 14 and forward housing 20 are suitably secured to the motor housing 18, as for example by suitable screw fasteners 25–29 extending from the forward lower housing part 22 through the central housing 18 and threaded into the spade handle housing 14. The upper forward housing part 24 is shown secured to the lower forward housing part 22 by screw fasteners 30–33.

A suitable rotary electric motor 40 is mounted centrally within the housing 12 with its axis coaxial with the cylindrical housing 18. A stator 42 and commutator brushes 44 of the motor are secured within the motor housing 18, and a motor armature shaft 46 is supported on rear and forward ball bearings 48, 50 respectively mounted on the spade handle housing 14 and lower forward housing part 22. A shoulder 52 of the motor shaft 46 engages the inner race 54 of the forward ball bearing 50 and the outer race of the bearing 50 engages a shoulder 56 of the housing part 22 to support the shaft 46 against forward axial displacement. A suitable fan 58 is press fit on the shaft 46 for drawing cooling air into the motor housing 18 via inlet passages 60 formed between the forward and intermediate housings 20, 18 and for directing the cooling air around the armature and out suitable outlet openings (not shown) in the spade handle housing 14. An electric cord 64 is connected to the spade handle and a trigger 62 and trigger operated switch (not shown) are provided in a conventional manner for energizing the electric motor 40.

An elongated tubular plunger or slide 70 is mounted within forward and rear support bushings 72, 74 in the upper forward housing part 24 in overlapping parallel relationship with the motor shaft 46 and for rectilinear reciprocable movement adjacent an upper flat edge 76 of the housing 12 and along an axis parallel to the axis of the shaft 46 in a common plane therewith through the rear spade handle. The bushings 72, 74 are mounted within a longitudinally extending bore 75 in the upper forward housing part 24; a suitable lubricant seal 78 encircles the tubular slide 70 at the forward end of the bore 75 and a rear cap and bushing assembly 80 mounted within the rear end of the bore 75 and received in part in a conforming partially cylindrical pocket in the motor housing 18 is provided for enclosing the rear end of the bore 75.

A crosspiece or yoke 84 having a U-shaped cross section is symmetrically mounted on the slide 70 within a conforming transverse slot 85 in the slide and is secured to the slide 70 by a suitable unit 86. The yoke 84 is mounted with its flat base portion 87 in sliding engagement with laterally spaced and inwardly facing flat bearing walls 88, 89 on the upper forward housing part 24.

A drive worm 90 is provided on the forward end of the motor shaft 46, and a pair of substantially identical drive or crank assemblies 94 are provided for drivingly interconnecting the crosspiece 84 on the tubular slide 70 with the drive worm 90. The drive assemblies 94 are mounted within laterally spaced bores or pockets 95 (having several sections with different diameters) in the lower forward housing part 22 for rotation about axes extending perpendicular to (and laterally outwardly offset from) the common plane of the parallel axes of the motor shaft 46 and slide 70. Each drive assembly 94 comprises a shaft 97, a ball bearing 98 mounted on an enlarged central portion 99 of the shaft 97, a worm wheel 100 secured onto a lower reduced end 102 of the shaft 97 in engagement with the drive worm 90, and a crank and counterweight sub-assembly 104 keyed onto an upper reduced end 106 of the shaft 97 and held in position by a retaining ring 107. The lower reduced end 102 of the shaft 97 is rotatably mounted within a suitable bushing 110, and each drive assembly 94 is suitably axially retained in position with the outer race of the bearing 98 in engagement with a locating shoulder 108 of the housing.

The drive worm 90 is connected for individually driving the drive assemblies 94 at the same angular velocity and in opposite angular directions and such that there is a balanced forward axial thrust on the motor shaft 46. The axial thrust on the shaft 46 maintains the forward shaft bearing in engagement with the housing shoulder 54 and the motor shaft 46 in the desired axial position. The crank and counterweight sub-assembly 104 comprises a counterweight 111 keyed onto the shaft 97, an upstanding crank pin 112 secured onto the counterweight 111 and a cylindrical roller 114 rotatably mounted on the crank pin 112 for rolling contact with the internal parallel side walls 115, 116 of the yoke 84. The roller 114 has a diameter approximately equal to but slightly less than the distance between the internal parallel sidewalls 115, 116 of the yoke 84 to prevent "play" therebetween but providing sufficient tolerance for rolling contact by the roller 114 with each sidewall.

The drive assemblies 94 are symmetrically positioned for smoothly reciprocating the yoke 84 and tubular slide 70 back and forth as the drive assemblies 94 are simultaneously rotated by the motor 40 via the motor shaft 46 and drive worm 90. Each counterweight 111 provides for dynamically balancing the respective drive assembly 94 to provide for smooth and substantially vibration free operation of the saw.

A saw blade holder 120 is mounted within the forward end of the tubular slide 70 for supporting a saw blade 112 for rectilinear reciprocable movement with the slide 70. The saw blade holder 120 described in detail in the commonly assigned application of Paul A. Ketchpel entitled "Saw Blade Holder For Portable Reciprocating Saw" and filed herewith, and will therefore not be described in detail here. A foot 124 is mounted forwardly of the housing 12 by a pair of arms 128 for supporting and guiding the saw blade in a conventional manner. The foot 124 is adapted to be adjusted on the arms 128 in accordance with the application of the saw.

It can be seen therefore that the reciprocating saw drive mechanism of the present invention provides for smoothly translating rotary motion into reciprocating motion for reciprocating the saw blade support tube 70, with the electric motor 40. Also, the drive mechanism provides a compact reciprocating saw assembly with the tubular slide 70 and motor shaft mounted in overlapping parallel relationship to provide a saw useful for various applications including both plunge and flush cutting and useful in hard-to-reach locations. Further, the drive transmission permits an economical assembly of parts providing smooth and maintenance free operation over a long useful life.

As will be apparent to persons skilled in the art, various modifications, adaptations and variations of the foregoing specific disclosure can be made without departing from the teachings of the present invention.

We claim:

1. An elongated portable reciprocating saw comprising a multipart housing with a rear spade handle, a forward transmission housing and an intermediate motor housing in longitudinal alignment, an electric motor mounted within the housing having a longitudinally extending rotatable motor shaft with a drive worm at the forward longitudinal end thereof received within the transmission housing, a saw blade support slide mounted in the transmission housing in overlapping relationship with the motor shaft for rectilinear reciprocating movement parallel to the shaft axis, a crosspiece yoke on the slide extending generally perpendicular to the common plane of the parallel axes of the slide and motor shaft, and a pair of rotatable drive assemblies having parallel axes on opposite sides of the motor shaft and extending perpendicular to and substantially equally laterally offset from the axis of the motor shaft, each drive assembly having a worm wheel in operative engagement with the motor shaft drive worm and a crank roller received within the crosspiece yoke for drivingly connecting the reciprocable slide and rotatable motor shaft.

2. An elongated portable reciprocating saw according to claim 1 wherein the forward transmission housing comprises a lower forward housing part having a pair of laterally spaced upwardly opening pockets for rotatably supporting the drive assemblies and an upper forward housing part providing a cover for the upwardly opening pockets of the lower forward housing part.

3. An elongated portable reciprocating saw according to claim 2 wherein the slide is reciprocably mounted in said upper forward housing part.

4. An elongated portable reciprocating saw according to claim 3 wherein the crosspiece yoke has an upper flat face and wherein the upper forward housing part has inwardly facing longitudinally extending integral bearings surfaces engageable with said upper flat face of the crosspiece yoke for supporting the yoke for rectilinear movement.

5. An elongated portable reciprocating saw according to claim 3 wherein the slide is a tube.

6. In a portable reciprocating saw having a saw blade support slide mounted for rectilinear reciprocable movement, a crosspiece yoke on the slide, a rotary electric motor with a rotatable drive shaft, and rotary drive means interconnecting the drive shaft and crosspiece yoke for reciprocating the slide with the motor, the improvement wherein the slide is mounted for rectilinear movement parallel to and in overlapping relationship with the motor drive shaft, wherein the motor drive shaft has a drive worm and wherein the rotary drive means comprises a pair of rotary drive assemblies having parallel axes on opposite sides of said drive shaft and extending perpendicular to and substantially equally laterally offset from the axis of the drive shaft, each drive assembly having a worm wheel in operative engagement with the motor shaft drive worm and a crank roller received within the crosspiece yoke for operatively connecting the slide with the motor shaft.

7. A portable reciprocating saw according to claim 6 wherein each rotary drive assembly further comprises a shaft, a ball bearing support mounted generally centrally on the shaft, the worm wheel being secured to the shaft at one end thereof, and a combined crank and counterweight sub-assembly secured to the other end of the shaft and having an upstanding crank pin and a roller rotatably mounted on the crank pin and received within the crosspiece yoke.

* * * * *